Feb. 11, 1958     J. S. COLLMAN     2,823,052
FLUID SEAL DEVICE
Filed April 12, 1954

INVENTOR
John S. Collman
BY
L. D. Burch
ATTORNEY

United States Patent Office 2,823,052
Patented Feb. 11, 1958

2,823,052

FLUID SEAL DEVICE

John S. Collman, Detroit, Mich., assignor to General Motors Corporation, Detroit, Mich., a corporation of Delaware Application April 12, 1954, Serial No. 422,455

3 Claims. (Cl. 286—10)

This invention relates to fluid seal devices, and more particularly to a fluid seal device in which the sealing fluid may be recirculated and at the same time maintained at a constant desired level.

Centrifugal fluid seals between parts rotating relative to but not contacting one another are well known. Whatever the individual design of any such device, the principle involved is usually the same and the cross-section of the sealing fluid chamber may be likened to a U-tube manometer which, in addition to having different pressures at each leg, is made to rotate about an axis normal to the legs and parallel to the connecting portion of the U. In such a case, the greater hydrostatic head in the leg subjected to the lesser pressure will, due to the effect of centrifugal force, cause the liquid to back up into the connecting portion of the U and down into the other leg against the greater pressure in the other leg until an equilibrium is reached where the difference in hydrostatic heads in the two legs is constant at given speed of rotation and pressure differential. The hydrostatic pressure resisting the higher manometer tube pressure will be greater when the difference in hydrostatic head in the two legs is farther removed from the axis of rotation, all other factors being constant. Thus, in a centrifugal seal of the type being considered, a greater sealing capacity will result if the sealing fluid can be kept near the outer periphery of the sealing fluid chamber and in sufficient quantities to just maintain the seal, which condition may be referred to as optimum sealing fluid level.

Since the parts between which the seal is to be maintained, or other parts associated therewith, are often subjected to high temperatures, it is desirable to cool those parts by circulating a coolant fluid therethrough. In many applications it would be desirable to cool the various parts by circulating the sealing fluid itself. Addition of sealing fluid is likewise necessary to replace that which is lost by evaporation and the like, since the above discussion of optimum level does not apply except when there is sufficient fluid to at least maintain a seal.

An obvious problem in circulating the sealing fluid is that of how much fluid to add without jeopardizing optimum level conditions. In addition, since the parts between which the seal is to be maintained do not contact each other, the difference in head may be driven inwardly from the periphery of the sealing fluid chamber by excessive addition of sealing fluid to the extent that leaking of the excess fluid from between the parts takes place.

In aircraft turbine installations, for example, cooling of the seal and other parts of the power plant is necessary, but the leaking of fluid would be objectionable for at least two reasons. In the first place, the supply of fluid is limited and the fluid must be conserved. Secondly, leaking of fluid would foul the other parts of the power plant which could not be tolerated. Also, space being limited, maximum sealing capacity must be obtained from a seal having the smallest possible diameter.

Since centrifugal fluid seals presently employed do not satisfactorily solve the above problems, it is now proposed to provide a centrifugal seal in which the sealing fluid may be added in excess to circulate the same and at the same time may be automatically maintained at optimum or any desired level in order that the seal will operate at desired capacity at all times, without leaking of the fluid and without other loss thereof as by evaporation.

The circulation of the sealing fluid may be accomplished by providing inlet and outlet passages in the sealing fluid chamber through which the sealing fluid may be pumped. The outlet passages are placed at the position of optimum level, or at any other predetermined level desired, so that any excess fluid may be drained off. Further, the passages may be positioned in a way to provide either an open or a closed system, the latter of which prevents contamination of other parts of the assembly by the sealing fluid and prevents the loss of fluid.

Figure 1:
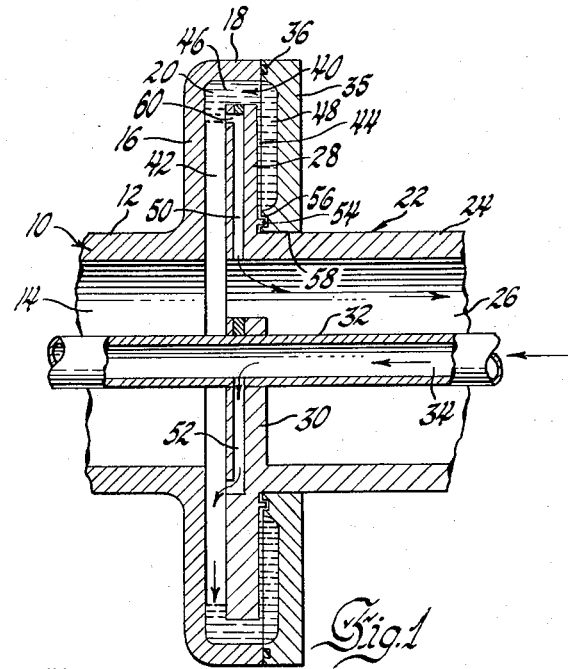
Figure 1 is a cross-sectional view of a fluid seal device embodying the invention in which the sealing and sealed fluids may be mixed and carried away in a common passage.

Referring to the drawings in more detail, and particularly to Figure 1, a rotatable member 10 comprises a hollow shaft 12 having an axial passage 14 and terminating in a radially extending annular flange 16 and an axially extending flange 18. Flanges 16 and 18 provide walls defining a radially extending annular recess 20. A stationary member 22 comprises a hollow shaft 24 having an axial passage 26 in alignment with the passage 14 and terminating in a radially extending annular flange 28 receivable within recess 20. Support member 30 extends into said passage 26 to support tubular member 32 having passage 34. Tubular member 32 extends axially of said passages 14 and 26 and is also stationary since it is rigidly secured to stationary member 22 through support 30. Cover 35 for recess 20 is suitably secured to flange 18 with a sealing gasket 36 therebetween to enclose flange 28 within sealing fluid chamber 40 comprising individual radially extending chambers 42 and 44 connected by peripheral chamber 46. Chambers 42, 44 and 46 are of sufficient width so that a body of fluid may be rotated therein by means such as vanes 48 on cover 35 to provide a hydrostatic pressure due to centrifugal force. Passage 50 terminating at one end thereof near the outer periphery of flange 28 provides communication of chamber 42 with passage 26, and passage 52 terminating at one end thereof on the same side of flange 28 as passage 50 provides communication of chamber 42 with passage 34. Shoulder 54 on flange 28 cooperates with groove 56 in cover 35 to provide a more tortuous path from chamber 46 to clearance 58 between cover 35 and shaft 24.

In the structure shown by Figure 1, a fluid such as water may be introduced into passage 34 for cooling a mechanism secured to rotatable shaft 12, in which case steam may return by way of passages 14 and 26. A portion of the water in passage 34 may be diverted through passage 52 and into sealing fluid chamber 40. Since the water in chamber 40 is made to spin with the aid of vanes 48 and is thus acted upon by centrifugal force, addition of excess water through passage 52 will cause the level thereof to build up toward the axis of rotation until the end 60 of passage 50 is reached, at which time the water will drain out through passage 50 into passage 26 to be carried away with the steam. Thus, water may be circulated through chamber 40 in excess without exceeding the level of end 60 of passage 50. It will be noted that the end 60 of passage 50 is preferably located on the high pressure side of flange 28 to insure return of excess fluid through passage 50 and at any desired level so that the radial position of the hydrostatic head may be controlled. It is also apparent that member 10, with suitable transposition of passages, could just as well be the stationary member without affecting the operation of the device.

Figure 2:
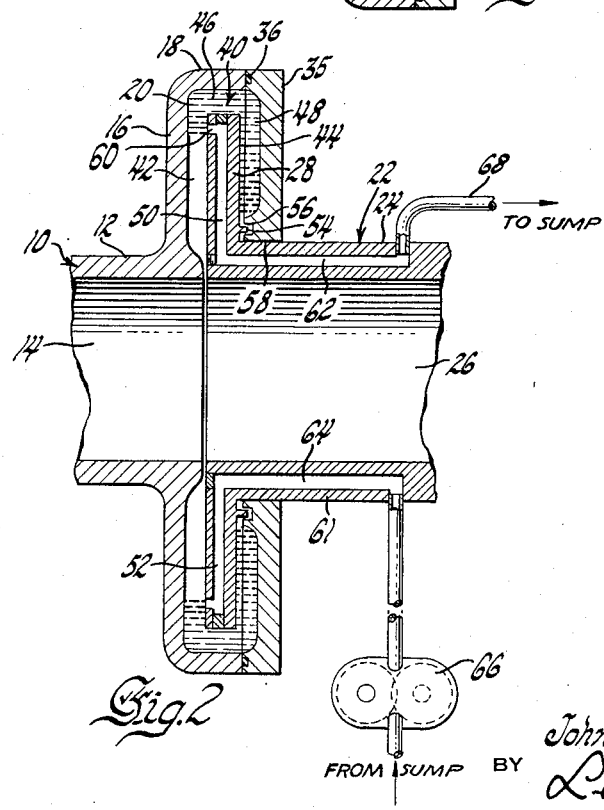
Figure 2 is a cross-sectional view of a modification of the fluid seal device shown by Figure 1 in which the sealing fluid is carried away from the seal chamber in a passage separate from the sealed fluid passage.

The modification shown by Figure 2 is very similar in structure and operation to that of the structure shown by Figure 1, the main difference being that in Figure 2 the sealing fluid returns from the seal chamber through a passage separate from the sealed fluid passages 14 and 26. This may be accomplished in any suitable manner such as by removing support member 30 and tubular member 32 and extending passages 50 and 52 along the wall 61 of hollow shaft 24 at 62 and 64, respectively. Thus, sealing fluid may be pumped from a sump by pump 66 into sealing fluid chamber 40 and returned to the sump by way of passages 50, 62 and line 68 in a closed circuit. It is apparent that tubular support 30 and member 32 need not be removed, so long as passage 34 does not communicate with passage 52.

It is further apparent that the structures shown by Figures 1 and 2 may be further modified or combined, without departing from the scope of the invention, to provide a device wherein the same or different fluids may be originally introduced and then either mixed or kept separate on return.

It will be observed from the foregoing specification and drawings that there has been provided a fluid seal device having a sealing fluid outlet passage which may be located at any desired radial position so that the sealing fluid may be circulated in excess and yet automatically maintained at a constant level.

What is claimed is:

1. The combination of a hollow outer member having walls at one end thereof said walls comprising a pair of axially spaced radially extending walls peripherally connected by a circumferentially extending wall and defining a radially extending annular recess, a relatively rotatable hollow inner member being provided with a radially outwardly extending flange at one end thereof, said flange being received within said recess and substantially surrounded on both sides and at the outer peripheral edge thereof by said walls defining said recess, said hollow members having axial passages in alignment and adapted to carry fluid, said recess being adapted to receive a sealing fluid between said walls and said flange during the rotation of at least one of said hollow members, a conduit extending through said aligned axial passages also adapted to carry fluid, sealing fluid inlet and outlet passages oppositely disposed on the same side of one of said members, said inlet passage providing communication between said conduit and said recess, said outlet passage communicating between said recess and said aligned axial passages, said outlet passage being located on said one member at a point radially outwardly disposed from said aligned axial passages, said point determining the desired sealing fluid level in said recess, whereby said sealing fluid may be added in excess to circulate said fluid while maintaining the desired fluid level in said recess.

2. The combination of a hollow outer member having spaced radial walls connected at their outer peripheries by an annular wall at one end thereof defining a radially extending annular recess, a relatively rotatable hollow inner member being provided with a radially outwardly extending flange at one end thereof, said flange being received within said recess and substantially surrounded on both sides and at the outer peripheral edge thereof by said walls defining said recess, said hollow members having axial passages in alignment and adapted to carry fluid, said recess being adapted to receive a sealing fluid between said walls and said flange during the rotation of at least one of said hollow members, a conduit extending through said aligned axial passages also adapted to carry fluid, sealing fluid inlet and outlet passages oppositely disposed on the same side of one of said members, said inlet passage providing communication between said conduit and said recess, said outlet passage being located on said one member at a point radially outwardly disposed from said aligned axial passages, said point determining the desired sealing fluid level in said recess, whereby said sealing fluid may be added in excess to circulate said fluid while maintaining the desired fluid level in said recess.

3. The combination of a hollow outer member having a pair of spaced radial walls connected at their outer peripheries by a cylindrical wall at one end thereof defining a radially extending annular recess, a hollow inner member being provided with a radially outwardly extending flange at one end thereof, said flange being received within said recess and substantially surrounded on both sides and at the outer peripheral edge thereof by said walls defining said recess, said outer member being rotatable and said inner member being fixed, said hollow members having axial passages in alignment and adapted to carry fluid in one direction, said recess being adapted to receive a sealing fluid between said walls and and said flange during the rotation of said outer member, a conduit extending through said aligned axial passages adapted to carry fluid in the opposite direction from the direction of the flow of fluid in said axial passages, sealing fluid inlet and outlet passages oppositely disposed on the same side of said inner member, said inlet passage providing communication between said conduit and said recess, said outlet passage being located on said inner member at a point radially outwardly disposed from said aligned axial passages, said point determining the desired sealing fluid level in said recess, whereby said sealing fluid may be added in excess to circulate said fluid while maintaining the desired fluid level in said recess.

References Cited in the file of this patent

UNITED STATES PATENTS

| 2,463,890 | Lundquist et al. | Mar. 8, 1949 |
| 2,463,898 | Moore | Mar. 8, 1949 |
| 2,665,929 | Sawyer | Jan. 12, 1954 |
| 2,678,835 | Clark | May 18, 1954 |